(12) United States Patent
Wei et al.

(10) Patent No.: US 11,510,115 B2
(45) Date of Patent: Nov. 22, 2022

(54) DATA TRANSMISSION WITH A USER PLANE NETWORK ELEMENT METHOD, RELATED DEVICE, AND COMPUTER STORAGE MEDIUM

(71) Applicant: HUAWEI TECHNOLOGIES CO., LTD., Guangdong (CN)

(72) Inventors: Xinpeng Wei, Beijing (CN); Fei Yang, Beijing (CN); Zhe Chen, Beijing (CN)

(73) Assignee: HUAWEI TECHNOLOGIES CO.. LTD., Guangdong (CN)

( * ) Notice: Subject to any disclaimer, the term of this patent is extended or adjusted under 35 U.S.C. 154(b) by 0 days.

(21) Appl. No.: 17/129,035

(22) Filed: Dec. 21, 2020

(65) Prior Publication Data

US 2021/0120470 A1   Apr. 22, 2021

Related U.S. Application Data

(63) Continuation of application No. PCT/CN2019/092273, filed on Jun. 21, 2019.

(30) Foreign Application Priority Data

Jun. 22, 2018   (CN) .......................... 201810665970.1

(51) Int. Cl.
*H04W 36/00* (2009.01)
*H04W 76/11* (2018.01)
*H04L 45/00* (2022.01)

(52) U.S. Cl.
CPC ......... *H04W 36/0077* (2013.01); *H04L 45/34* (2013.01); *H04W 36/00835* (2018.08); *H04W 76/11* (2018.02)

(58) Field of Classification Search
None
See application file for complete search history.

(56) References Cited

U.S. PATENT DOCUMENTS

| 6,647,026 B1 | 11/2003 | Tanaka |  |
| 2009/0040982 A1* | 2/2009 | Ho | ........................ H04L 1/1896 |
|  |  |  | 370/331 |

(Continued)

FOREIGN PATENT DOCUMENTS

| CN | 101365239 A | 2/2009 |
| CN | 101548563 A | 9/2009 |

(Continued)

*Primary Examiner* — Anh Ngoc M Nguyen
(74) *Attorney, Agent, or Firm* — Womble Bond Dickinson (US) LLP

(57) ABSTRACT

Embodiments of the present disclosure provide a method. According to the method, a mark is added to a data packet. After user equipment is handed over from an original device to a target device, and before a user plane network element receives a handover notification, the user plane network element sends, through a path used before handover, a data packet that carries a first mark to the original device. The original device modifies the first mark in the data packet to a second mark, and then forwards, to the target device, a data packet whose mark is modified and that carries the second mark. After receiving the handover notification, the user plane network element sends, to the target device, a data packet that carries a fourth mark. The target device can distinguish between sources of the received data packets based on different marks in the received data packets.

20 Claims, 8 Drawing Sheets

(56) References Cited

U.S. PATENT DOCUMENTS

2009/0124259 A1   5/2009  Attar et al.
2009/0296655 A1*  12/2009  Tamura ................... H04L 47/34
                                                                    370/331

FOREIGN PATENT DOCUMENTS

| CN | 107666436 A   | 2/2018 |
|----|---------------|--------|
| CN | 108024314 A   | 5/2018 |
| CN | 108029053 A   | 5/2018 |
| EP | 2088793 A1    | 8/2009 |
| EP | 2187664 A1    | 5/2010 |
| EP | 3493487 A1    | 6/2019 |
| WO | 2018079998 A1 | 5/2018 |

* cited by examiner

| Next header | Header extension length | Routing type | Segments left |
|---|---|---|---|
| Last entry | Flag | Tag ||
| Segment list [0] (IPv6 address of 128 bits) ||||
| Segment list [1] (IPv6 address of 128 bits) ||||
| ⋮ ||||
| Segment list [n] (IPv6 address of 128 bits) ||||
| Options field ||||

DATA TRANSMISSION WITH A USER PLANE NETWORK ELEMENT METHOD, RELATED DEVICE, AND COMPUTER STORAGE MEDIUM

CROSS-REFERENCE TO RELATED APPLICATIONS

This application is a continuation of International Application No. PCT/CN2019/092273, filed on Jun. 21, 2019, which claims priority to Chinese Patent Application No. 201810665970.1, filed on Jun. 22, 2018, The disclosures of the aforementioned applications are hereby incorporated by reference in their entireties.

TECHNICAL FIELD

The present disclosure relates to the field of communications technologies, and in particular, to a data transmission method, a related device, and a computer storage medium.

BACKGROUND

Segment routing (segment routing, SR) is a source routing protocol. In the SR protocol, a source node specifies a transmission path for a data packet, converts information about nodes on the path into an ordered segment list, and encapsulates the segment list into the data packet. A node on the data packet transmission path only needs to forward the data packet according to a path specified in the segment list, so that data transmission can be simplified in a network.

SR for IPv6 (segment routing for IPv6, SRv6) is a solution for implementing the SR based on an IPv6 protocol. A segment list in the SRv6 is an IPv6 address list, and the node on the data packet transmission path needs to perform transmission according to only a path indicated by the IPv6 address list. However, an existing SRv6 solution cannot meet a function requirement in a mobile handover process. This is mainly reflected in the following: After user equipment is handed over from an original device to a target device, the target device cannot distinguish whether received data is from the original device or from another network device. Data sent by the original device to the target device should be sent to the user equipment before data sent by the another network device to the target device, and the target device cannot distinguish a source of the received data. Therefore, it cannot be ensured that the received data is sent to the user equipment in an orderly manner.

SUMMARY

Embodiments of the present disclosure disclose a data transmission method, a related device, and a computer storage medium. In a manner of adding a mark in a data packet, a node on a data packet transmission path can distinguish a data source by using the added mark, to determine a sending sequence of the data packet.

An embodiment of the present disclosure provides a data transmission method, including:

receiving, by an original device after sending a handover notification, a first data packet sent by a user plane network element through a path used before handover, where a first mark is carried in the first data packet, and the first mark is used to indicate that the first data packet is from the user plane network element;

modifying the first mark in the first data packet to a second mark, and sending the modified first data packet to a target device, where the second mark is used to indicate that the modified first data packet is an in-transit data packet, and the in-transit data packet is data that should be sent to the target device by the user plane network element after the handover, but is sent to the original device;

receiving a second data packet sent by the user plane network element, where a third mark is carried in the second data packet, and the third mark is used to indicate that the user plane network element stops sending data to the original device through the path used before the handover; and sending the second data packet to the target device.

In an embodiment, the first data packet includes at least a first routing field, first routing information is carried in the first routing field, and the first routing information is information about one or more first nodes through which the first data packet passes from the user plane network element to the original device; and the second data packet includes at least a second routing field, second routing information is carried in the second routing field, and the second routing information is information about one or more second nodes through which the second data packet passes from the user plane network element to the original device.

In an embodiment, the first routing field includes one or more first routing units, the one first routing unit has a correspondence with the one first node, the plurality of first routing units have a one-to-one correspondence with the plurality of first nodes, each of the one or more first routing units includes at least a route distinguisher and a data source identifier, node information of each of the one or more first nodes is carried in the route distinguisher of a corresponding first routing unit, and the first mark is carried in the data source identifier of each of the one or more first routing units; and the second routing field includes one or more second routing units, the one second routing unit has a correspondence with the one second node, the plurality of second routing units have a one-to-one correspondence with the plurality of second nodes, each of the one or more second routing units includes at least a route distinguisher and a data source identifier, node information of each of the one or more second nodes is carried in the route distinguisher of a corresponding second routing unit, and the third mark is carried in the data source identifier of each of the one or more second routing units.

In an embodiment, the first data packet further includes a first extension field, and the first mark is carried in the first extension field. The second data packet further includes a second extension field, and the third mark is carried in the second extension field.

In a possible embodiment, the sending a modified first data packet to a target device includes:

obtaining third routing information, where the third routing information is carried in a temporary forwarding table created by the original device after the handover notification is sent;

encapsulating the modified first data packet based on the third routing information to obtain a third data packet, where the third routing information is information about one or more third nodes through which the third data packet passes from the original device to the target device; and sending the third data packet to the target device.

In an embodiment, the third data packet includes at least a third routing field, and the third routing information is carried in the third routing field.

In an embodiment, the third routing field includes one or more third routing units, the one third routing unit has a correspondence with the one third node, the plurality of third routing units have a one-to-one correspondence with the plurality of third nodes, each of the one or more third routing units includes at least a route distinguisher and a data source identifier, node information of each of the one or more third nodes is carried in the route distinguisher of a corresponding third routing unit, and the second mark is carried in the data source identifier of each of the one or more third routing units.

In an embodiment, the third data packet further includes a third extension field, and the third mark is carried in the third extension field.

In an embodiment, the sending the second data packet to the target device includes:

obtaining third routing information, where the third routing information is carried in a temporary forwarding table created by the original device after the handover notification is sent;

encapsulating the second data packet based on the third routing information to obtain a fifth data packet, where the third routing information is information about one or more fifth nodes through which the fifth data packet passes from the original device to the target device; and sending the fifth data packet to the target device.

In an embodiment, the fifth data packet includes at least a fifth routing field, and the third routing information is carried in the fifth routing field.

In an embodiment, the fifth routing field includes one or more fifth routing units, the one fifth routing unit has a correspondence with the one fifth node, the plurality of fifth routing units have a one-to-one correspondence with the plurality of fifth nodes, each of the one or more fifth routing units includes at least a route distinguisher and a data source identifier, node information of each of the one or more fifth nodes is carried in the route distinguisher of a corresponding fifth routing unit, and the third mark is carried in the data source identifier of each of the one or more fifth routing units.

In an embodiment, the fifth data packet further includes a fifth extension field, and the third mark is carried in the fifth extension field.

An embodiment of this disclosure provides a data transmission method, including:

sending, by a user plane network element before receiving a handover notification, a first data packet to an original device through a path used before handover, where a first mark is carried in the first data packet, and the first mark is used to indicate that the first data packet is from the user plane network element;

sending, by the user plane network element after receiving the handover notification, a second data packet to the original device, where a third mark is carried in the second data packet, and the third mark is used to indicate that the user plane network element stops sending data to the original device through the path used before the handover; and sending, by the user plane network element, a fourth data packet to a target device through a path used after the handover, where a fourth mark is carried in the fourth data packet, and the fourth mark is used to indicate that the fourth data packet is from the user plane network element.

In an embodiment, the first data packet includes at least a first routing field, first routing information is carried in the first routing field, and the first routing information is information about one or more first nodes through which the first data packet passes from the user plane network element to the original device; and the second data packet includes at least a second routing field, second routing information is carried in the second routing field, and the second routing information is information about one or more second nodes through which the second data packet passes from the user plane network element to the original device; and the fourth data packet includes at least a fourth routing field, fourth routing information is carried in the fourth routing field, and the fourth routing information is information about one or more fourth nodes through which the fourth data packet passes from the user plane network element to the target device.

In an embodiment, the first routing field includes one or more first routing units, the one first routing unit has a correspondence with the one first node, the plurality of first routing units have a one-to-one correspondence with the plurality of first nodes, each of the one or more first routing units includes at least a route distinguisher and a data source identifier, node information of each of the one or more first nodes is carried in the route distinguisher of a corresponding first routing unit, and the first mark is carried in the data source identifier of each of the one or more first routing units;

the second routing field includes one or more second routing units, the one second routing unit has a correspondence with the one second node, the plurality of second routing units have a one-to-one correspondence with the plurality of second nodes, each of the one or more second routing units includes at least a route distinguisher and a data source identifier, node information of each of the one or more second nodes is carried in the route distinguisher of a corresponding second routing unit, and the third mark is carried in the data source identifier of each of the one or more second routing units; and the fourth routing field includes one or more fourth routing units, the one fourth routing unit has a correspondence with the one fourth node, the plurality of fourth routing units have a one-to-one correspondence with the plurality of fourth nodes, each of the one or more fourth routing units includes at least a route distinguisher and a data source identifier, node information of each of the one or more fourth nodes is carried in the route distinguisher of a corresponding fourth routing unit, and the fourth mark is carried in the data source identifier of each of the one or more fourth routing units.

In an embodiment, the first data packet further includes a first extension field, and the first mark is carried in the first extension field. The second data packet further includes a second extension field, and the third mark is carried in the second extension field. The fourth data packet further includes a fourth extension field, and the fourth mark is carried in the fourth extension field. The first mark and the fourth mark are the same.

An embodiment of this disclosure provides a data transmission method, including:

receiving, by a target device after receiving a handover notification, a fourth data packet sent by a user plane network element, and buffering the fourth data packet, where a fourth mark is carried in the fourth data packet, and the fourth mark is used to indicate that the fourth data packet is from the user plane network element;

receiving a third data packet sent by an original device, and sending the third data packet to user equipment, where a second mark is carried in the third data packet, the second mark is used to indicate that the third data packet is an in-transit data packet, and the in-transit data packet is data that should be sent to the target device by the user plane network element after handover but is sent to the original device;

receiving a fifth data packet sent by the original device, where a third mark is carried in the fifth data packet, and the third mark is used to indicate that the original device stops sending data to the target device; and sending the buffered fourth data packet to the user equipment, or sending the fifth data packet to the user equipment, and then sending the fourth data packet to the user equipment.

In an embodiment, the third data packet includes at least a third routing field, third routing information is carried in the third routing field, and the third routing information is information about one or more third nodes through which the third data packet passes from the original device to the target device;

the fourth data packet includes at least a fourth routing field, fourth routing information is carried in the fourth routing field, and the fourth routing information is information about one or more fourth nodes through which the fourth data packet passes from the user plane network element to the target device; and the fifth data packet includes at least a fifth routing field, and the third routing information is carried in the fifth routing field.

In an embodiment, the third routing field includes one or more third routing units, the one third routing unit has a correspondence with the one third node, the plurality of third routing units have a one-to-one correspondence with the plurality of third nodes, each of the one or more third routing units includes at least a route distinguisher and a data source identifier, node information of each of the one or more third nodes is carried in the route distinguisher of a corresponding third routing unit, and the second mark is carried in the data source identifier of each of the one or more third routing units;

the fourth routing field includes one or more fourth routing units, the one fourth routing unit has a correspondence with the one fourth node, the plurality of fourth routing units have a one-to-one correspondence with the plurality of fourth nodes, each of the one or more fourth routing units includes at least a route distinguisher and a data source identifier, node information of each of the one or more fourth nodes is carried in the route distinguisher of a corresponding fourth routing unit, and the fourth mark is carried in the data source identifier of each of the one or more fourth routing units; and the fifth routing field includes one or more fifth routing units, the one fifth routing unit has a correspondence with the one fifth node, the plurality of fifth routing units have a one-to-one correspondence with the plurality of fifth nodes, each of the one or more fifth routing units includes at least a route distinguisher and a data source identifier, node information of each of the one or more fifth nodes is carried in the route distinguisher of a corresponding fifth routing unit, and the third mark is carried in the data source identifier of each of the one or more fifth routing units.

In an embodiment, the third data packet further includes a third extension field, and the second mark is carried in the third extension field;

the fourth data packet further includes a fourth extension field, and the fourth mark is carried in the fourth extension field; and the fifth data packet further includes a fifth extension field, and the third mark is carried in the fifth extension field.

In an embodiment of the present disclosure, a mark is added to a data packet. After the user equipment is handed over from the original device to the target device, and before the user plane network element receives the handover notification, the user plane network element sends, through the path used before handover, the data packet that carries the first mark to the original device. The original device modifies the first mark in the data packet to the second mark, and then forwards, to the target device, the data packet whose mark is modified and that carries the second mark. After receiving the handover notification, the user plane network element sends, to the target device, the data packet that carries the fourth mark (which is the same as the first mark). The target device can distinguish between sources of the received data packets based on different marks in the received data packets. The target device first sends the data packet that carries the second mark to the user equipment, and then sends the data packet that carries the fourth mark to the user equipment, so as to ensure ordered data transmission.

An embodiment of the present disclosure provides a network device, including a unit for performing the method according to the first aspect.

An embodiment of the present disclosure further provides a network device, including a unit for performing the method according to the second aspect.

An embodiment of the present disclosure further provides a network device, including a unit for performing the method according to the third aspect.

An embodiment of the present disclosure provides a network device, including a processor, a transceiver, and a memory. The memory is configured to store an instruction, the processor is configured to execute the instruction, and the transceiver is configured to communicate with another device under control of the processor. When executing the instruction, the processor performs the method according to the first aspect.

An eighth aspect, an embodiment of the present disclosure further provides a network device, including a processor, a transceiver, and a memory. The memory is configured to store an instruction, the processor is configured to execute the instruction, and the transceiver is configured to communicate with another device under control of the processor. When executing the instruction, the processor performs the method according to the second aspect.

An embodiment of the present disclosure provides a network device, including a processor, a transceiver, and a memory. The memory is configured to store an instruction, the processor is configured to execute the instruction, and the transceiver is configured to communicate with another device under control of the processor. When executing the instruction, the processor performs the method according to the third aspect.

An embodiment of the present disclosure provides a computer storage medium, the computer readable storage medium stores a computer program, and when the computer program is executed by a processor, the method according to the first aspect is implemented.

An embodiment of the present disclosure further provides a computer storage medium, the computer readable storage medium stores a computer program, and when the computer program is executed by a processor, the method according to the second aspect is implemented.

An embodiment of the present disclosure further provides a computer storage medium, the computer readable storage medium stores a computer program, and when the computer program is executed by a processor, the method according to the third aspect is implemented.

BRIEF DESCRIPTION OF DRAWINGS

To describe the technical solutions in the embodiments of the present disclosure more clearly, the following briefly introduces the accompanying drawings required for describing the embodiments. It is clearly that the accompanying drawings in the following description show some embodiments of the present disclosure, and a person of ordinary skill in the art may still derive other drawings from these accompanying drawings without creative efforts.

DESCRIPTION OF EMBODIMENTS

Figure 1:
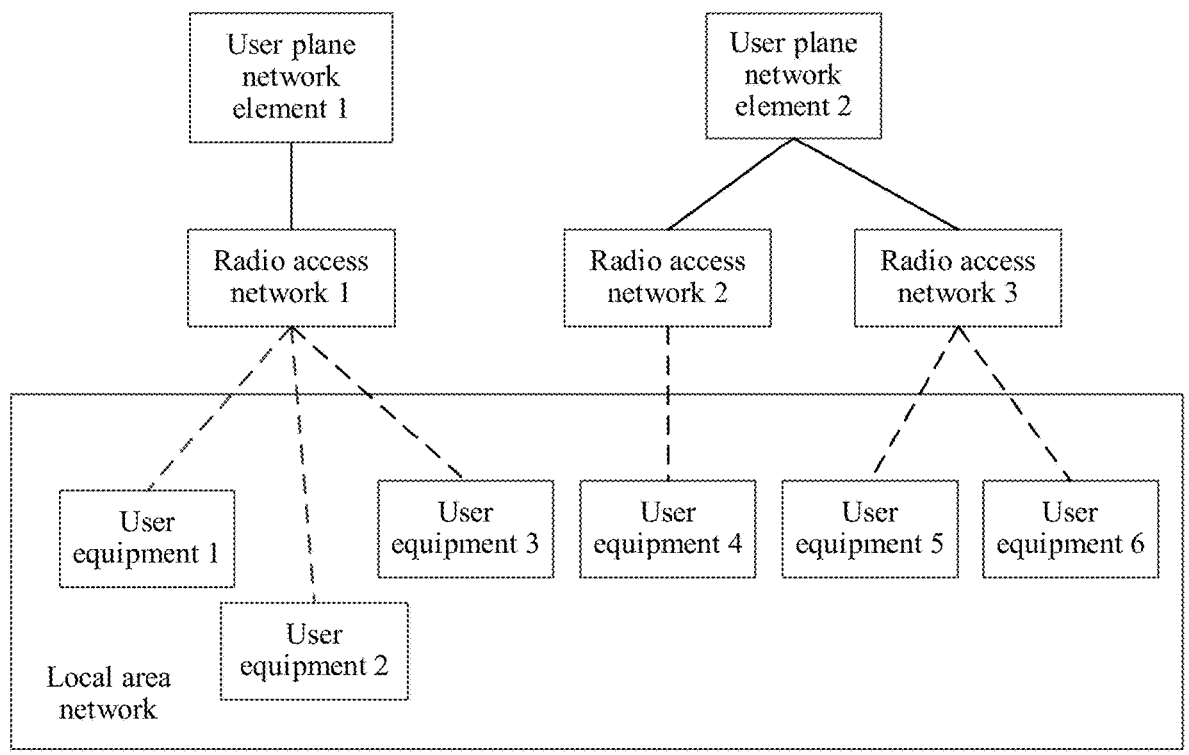
FIG. 1 is a schematic diagram of a 5G LAN in the prior art.

A 5G network is a 5th generation mobile communications network. A 5G local area network (5G local area network, 5G LAN) is a LAN constructed based on the 5G network. The 5G LAN can implement, by using low latency and high reliability of the 5G network, a continuity service covered in an entire area. FIG. 1 is a schematic diagram of a 5G LAN according to this disclosure. As shown in the figure, each user equipment (user equipment, UE) is connected to a corresponding radio access point (radio access network, RAN), and each RAN is connected to a corresponding user plane network element (user plane function, UPF). In the LAN shown in the figure, if UE 1 in the user equipment (user equipment, UE) needs to communicate with UE 4, a data transmission path is UE 1→RAN 1→UPF 1→UPF 2→RAN 2→UE 4. If UE 2 needs to communicate with UE 5, a data transmission path is UE 2→RAN 1→UPF 1→UPF 2→RAN 3→UE 5. It can be learned from the foregoing analysis that data needs to pass through a UPF when UEs communicate with each other in the LAN. However, in the 5G network, the UPF is deployed at a higher layer. If the data always passes through the UPF when the UEs communicate with each other in the LAN, a communication latency is caused by a relatively long data transmission path, and the UPF is also overloaded.

Figures 2, 3:
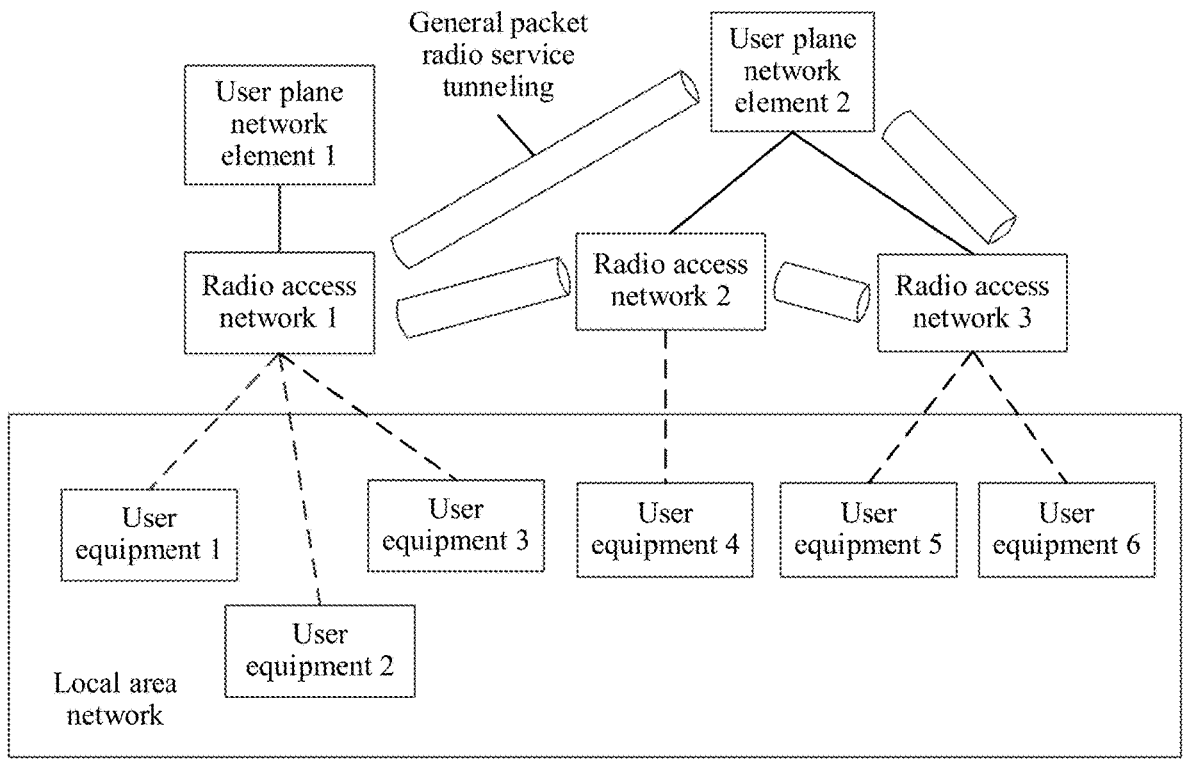
FIG. 2 is a schematic diagram of a GTP-based transmission path in the prior art.
FIG. 3 is a schematic diagram of an SRH in the prior art.

To resolve the foregoing problem, a GPRS tunneling protocol (general packet radio service tunneling protocol, GTP) is used in the prior art to optimize the data transmission path and reduce the communication latency. The GPRS tunneling protocol is a data transmission protocol designed in a 3GPP network architecture. The protocol may optimize the data transmission path by establishing GTP tunnels between UPFs, between RANs, and between a UPF and a RAN. The protocol can reduce a quantity of nodes through which data needs to pass during data transmission, and reduce a communication latency. FIG. 2 is a schematic diagram of a GTP-based transmission path. When UE 1 needs to communicate with UE 4, because a GTP tunnel is established between a RAN 1 and a RAN 2, a data transmission path may be UE 1→RAN 1→RAN 2→UE 4, and data sent by the UE 1 can be sent to the UE 4 without passing through a UPF 1 and a UPF 2. When UE 2 needs to communicate with UE 5, a data transmission path may be UE 2→RAN 1→RAN 2→RAN 3→UE 5, or may be UE 2→RAN 1→UPF 2→RAN 3→UE 5. It can be learned that in the GTP protocol, a GTP tunnel is established between communication nodes, so that the data transmission path can be optimized in a LAN and the communication latency can be reduced. In addition, because not all data needs to pass through a UPF during transmission, loads of the UPF may also be reduced. However, in a GTP tunnel establishment manner, to connect UEs that communicate with each other in a same LAN, GTP tunnels that connect two UEs needs to be separately established between any two UEs that communicate with each other. For example, in FIG. 2, when the UE 1 communicates with the UE 4, a GTP tunnel needs to be established between the RAN 1 and the RAN 2. In this case, if the UE 2 also needs to communicate with the UE 4, another GTP tunnel needs to be established between the RAN 1 and the RAN 2. If a plurality of groups of UEs in the LAN need to communicate with each other, a large quantity of GTP tunnels exist in the LAN. In addition, in a GTP tunnel maintaining process, a process such as establishing, deleting, and the like of the GTP tunnel needs to be implemented by using signaling. For example, when the UE 1 communicates with the UE 5, a data transmission path is UE 1→RAN 1→UPF 2→RAN 3→UE 5. That is, a GTP tunnel is established between the RAN 1 and the UPF 2, and a GTP tunnel is established between the UPF 2 and the RAN 3. If the UE 1 is handed over, and the UE 1 is handed over from a connection to the RAN 1 to a connection to the RAN 2, the GTP tunnel between the RAN 1 and the UPF 2 and the GTP tunnel between the UPF 2 and the RAN 3 may be deleted, and a tunnel is established between the RAN 2 and the RAN 3. If there are a plurality of groups of UEs that communicate with each other in the LAN and the UE constantly moves, a large quantity of GTP tunnels are established and deleted. Therefore, the GTP tunnel establishment manner is complex.

Segment routing (segment routing, SR) is a source routing protocol or is referred to as a segment routing protocol. A basic idea of the SR is to allocate a segment identifier (segment identification, SID) to each node, and a source node specifies a path for a data packet that needs to be transmitted, converts the SIDs of the nodes on the path into an ordered segment list, and encapsulates the segment list in the data packet. After receiving the data packet, each node on the path only needs to forward the data packet based on a path specified by the SID in the segment list. The source node is a first node in a data transmission process. Each SID corresponds to a node in a data packet forwarding process and a manner of processing the data packet by the node. For example, in FIG. 2, if the UE 1 needs to send a data packet to the UE 5, the UE 1 sends the data packet to the RAN 1. The source node RAN 1 converts SIDs of the node RAN 2, the node RAN 3, and the UE 5 into a segment list, encapsulates the segment list in the data packet, and forwards, to the RAN 2, a data packet obtained after the segment list is encapsulated. After receiving the data packet, the RAN 2 forwards the data packet to the RAN 3 based on information in the segment list. After the RAN 3 receives the data packet, the RAN 3 is a last node on a forwarding path based on the information in the segment list, and the RAN 3 deletes the segment list encapsulated by the RAN 1 in the data packet, and then sends the data packet to the UE 5. It can be learned from the foregoing analysis that, in an SR solution, the node on the path needs to forward the data packet only based in the path specified by the SIDs in the segment list. This can resolve a complex problem of establishing a large quantity of tunnels between network nodes and maintaining the tunnel in the GTP, and make data transmission in a network simpler.

The SR has good scalability. For example, an existing IPv6 forwarding plane may be reused. Implementing the SR based on an IPv6 protocol is a solution of SR for IPv6 (segment routing for IPv6, SRv6). In the SRv6, a source node on a data packet transmission path adds an IPv6 segment routing header (segment routing header, SRH) to a data packet. Each SRH carries all SIDs required by the data packet. Each SID is an IPv6 address. To be specific, the foregoing segment list encapsulated in the data packet is correspondingly an IPv6 address list in the SRH. The SRH carries information about all network nodes through which the data packet needs to pass. During transmission, the data packet is transmitted based on only a path indicated by the IPv6 address list in the SRH. FIG. 3 is a schematic diagram of an SRH. In FIG. 3, the SRH includes a next header (next header), a header extension length (hdr ext len), a routing type (routing type), segments left (segments left), a segment list (segments list), an option (options) field, and the like. The segment list includes an IPv6 address of each node through which the data packet needs to pass during transmission. The option field includes one or more codes in a type-length-value (type-length-value, TLV) format. A length of the option field is variable, but it is ensured that a length of the entire header is an integral multiple of eight octets.

Figure 4:
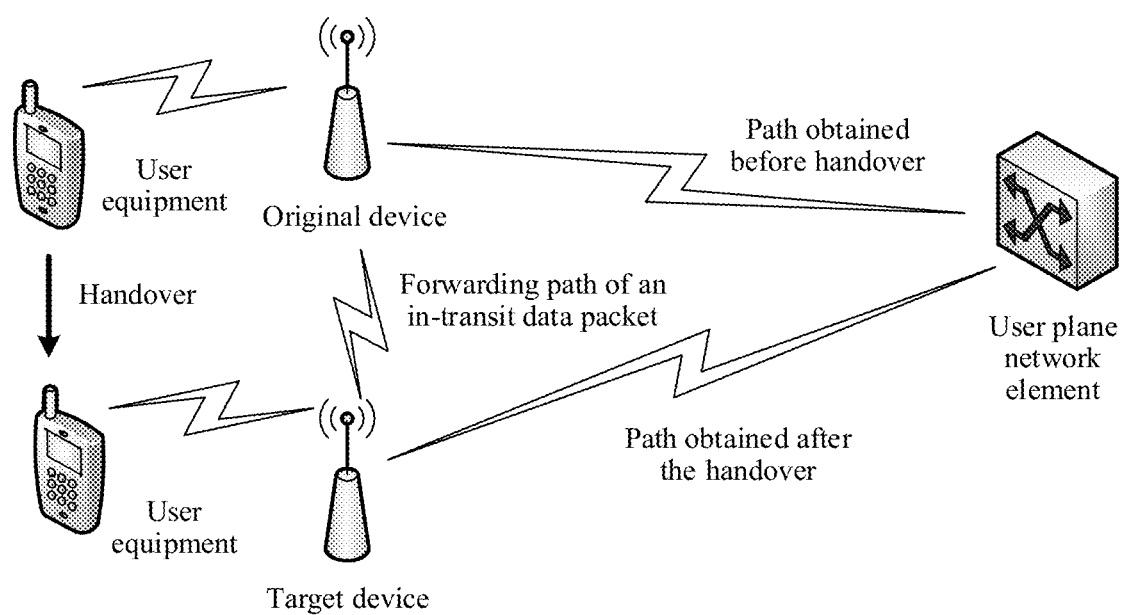
FIG. 4 is a schematic diagram of a network structure of a data transmission method according to an embodiment of the present disclosure.

However, currently, an SRv6 solution defined by the internet engineering task force (the internet engineering task force, IETF) cannot fully meet a requirement in a mobile network user plane protocol. This is mainly reflected in a failure to meet a function requirement in a mobile handover process. In the mobile handover process, after the UE is handed over from a connection to an original device to a connection to a target device, a network device that communicates with the UE cannot immediately learn that the UE is handed over. The network device continues to send a data packet to the original device. The original device forwards, to the target device, the data packet received after the UE is handed over, and the target device sends the data packet to the UE. After receiving a notification that the UE is handed over, the network device directly sends the data packet to the target device. In the existing SRv6 solution defined by the IETF, the target device cannot distinguish, based on data in the received data packet, whether the received data packet is an in-transit data packet or a new path data packet. As a result, ordered transmission of the data packet cannot be ensured in the handover process. The in-transit data packet is a data packet sent, after the UE is handed over, to the original device by the network device through a path used before the handover. The network device sends the data packet before receiving the handover notification. The new path data packet is a data packet sent to the target device by the network device through a path used after the handover. The network device sends the data packet after receiving the handover notification. For example, FIG. 4 is a schematic diagram of data transmission in a UE handover process. User equipment UE is a mobile phone, an original device is a source base station, and a target device is a target base station. After the UE is handed over from a connection to the source base station to a connection to the target base station, the source base station sends the handover notification to a user plane network element UPF. Before receiving the handover notification sent by the source base station, the UPF continuously sends the data packet to the source base station along the path used before the handover. In this case, the source base station sends the received data packet to the target base station. After receiving the handover notification sent by the source base station, the UPF sends the data packet to the target base station along a new path used after the handover. After the UE is handed over, the data packet that is received by the target base station and that is sent by the source base station is an in-transit data packet, and the data packet that is received by the target base station and that is sent by the UPF through the new path used after the handover is a new path data packet. The target base station cannot distinguish, based on the data in the received data packet, whether the received data packet is an in-transit data packet or a new path data packet. As a result, the target base station cannot transmit the received data packets to the UE in an orderly manner.

To resolve the foregoing problem, this disclosure provides a data transmission method. In a possible embodiment, the method is described by using a network architectural diagram shown in FIG. 4 as an example. The network framework schematic diagram includes user equipment UE, an original device, a target device, and a user plane network element. A quantity of devices or platforms in the network framework schematic diagram is not limited in this disclosure.

The user equipment UE is configured to connect to the user plane network element by using an access network device (which may be specifically the original device or the target device in the figure).

Optionally, the UE may be a terminal-side device such as a mobile phone, a tablet computer (table personal computer), a personal digital assistant (personal digital assistant, PDA), a mobile internet device (mobile internet device, MID), or a wearable device (wearable device). A specific form or type of the UE is not limited in this disclosure.

The original device and the target device are network devices that connect the UE to a network, and may be configured to determine, based on a signal measurement report reported by the UE, whether the UE needs to be handed over from the access network device. If the UE needs to be handed over from the access network device, a handover notification may be further sent to the user plane network element, so as to notify the user plane network element that the UE is to be handed over from the access network device.

Optionally, the original device and the target device in the figure may be access network devices of a same type or different types. The original device and the target device include but are not limited to an evolved NodeB (Evolved NodeB, eNB), a home evolved NodeB (Home Evolved NodeB, HeNB), a radio network controller (radio network controller, RNC) in a radio access network, a base station controller (base station controller, BSC) in the radio access network, and the like. The following describes related content by using an example in which the original device and the target device are the base station eNB (to be specific, the original device is a source base station, and the target device is a target base station) in this disclosure.

The user plane network element is a network ingress node in a network architecture shown in FIG. 4. After receiving a data packet that needs to be sent to the UE, the user plane network element encapsulates a segment of header that includes routing information and mark information into the data packet, to form a new data packet. The routing information is information about one or more nodes through which the new data packet passes from the user plane network element to the UE.

Optionally, the user plane network element may be a serving gateway (serving-gateway, S-GW), a packet data network gateway (packet data network-gateway, P-GW), or the like, or may be a device that is the same as the foregoing original device or the foregoing target device. A specific form or type of the user plane network element is not limited in this disclosure.

Figure 5:
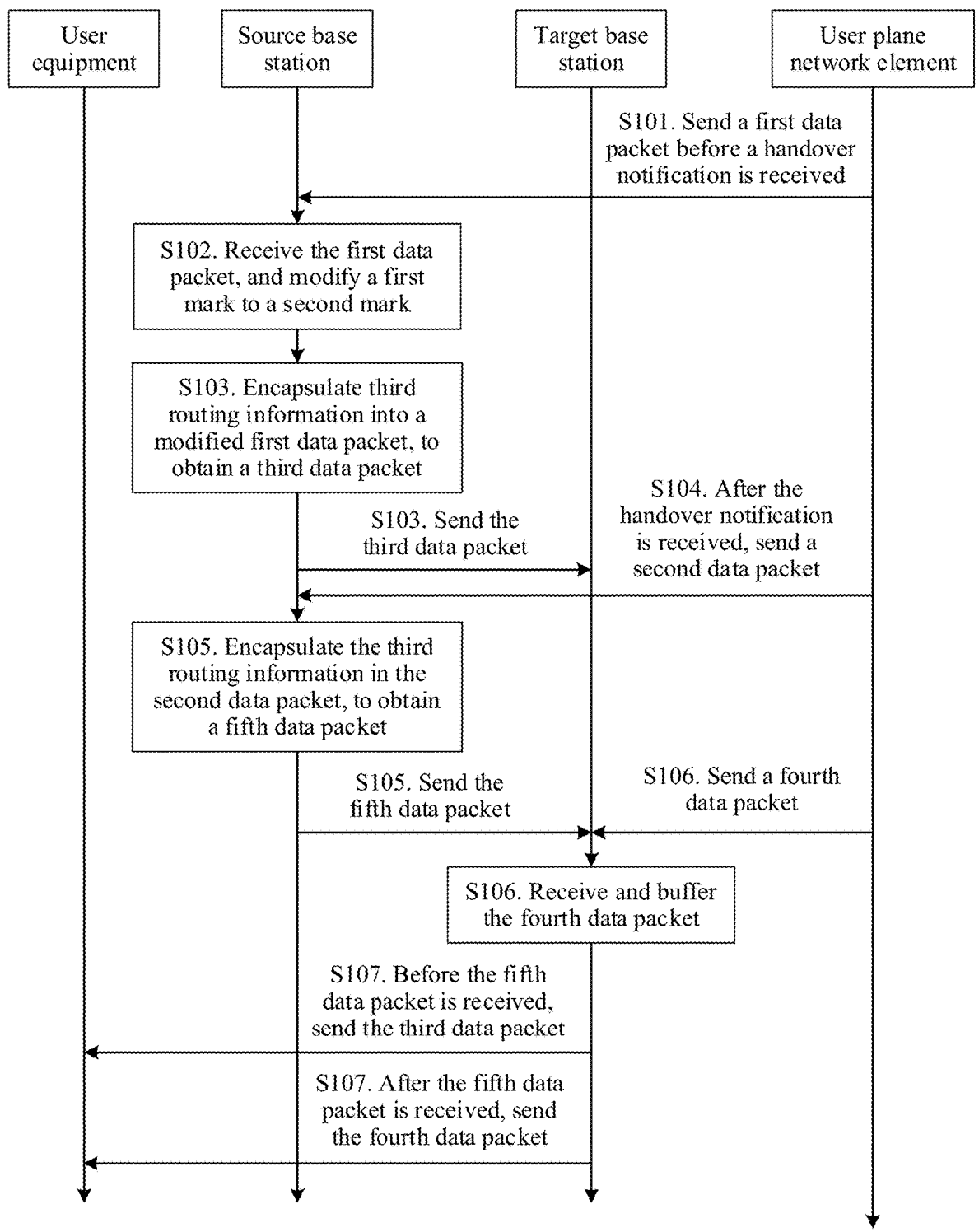
FIG. 5 is a schematic interaction diagram of a data transmission method according to an embodiment of the present disclosure.

Based on the network architecture shown in FIG. 4, related embodiments of a data transmission method in this disclosure are described below. FIG. 5 is a schematic interaction diagram of a data transmission method according to an embodiment of the present disclosure. The method shown in FIG. 5 may include the following blocks.

S101. After the source base station sends a handover notification, and before the user plane network element receives the handover notification, the user plane network element sends the first data packet to the source base station through a path used before handover, where a first mark is carried in the first data packet, and the first mark is used to indicate that the first data packet is from the user plane network element.

In the network architecture shown in FIG. 4, after receiving a data packet that needs to be sent to UE, the user plane network element encapsulates first routing information and the first mark in the received data packet to obtain the first data packet. The first routing information is carried in the first routing field. The first routing information is information about one or more first nodes through which the first data packet passes from the user plane network element to the source base station. The handover notification is used to indicate that the UE is handed over from a connection to the source base station to a connection to a target base station. Before the UE is handed over, the user plane network element sends the first data packet to the source base station, and the source base station sends the first data packet to the UE. After the UE is handed over, and before the user plane network element receives the handover notification sent by the source base station, the user plane network element continues to send the first data packet to the source base station through the path used before the handover. The one or more first nodes on the path used before the handover are used to send the first data packet to the source base station based on the first routing information.

A method for determining, by the source base station, that the UE is handed over from the source base station to the target base station may be as follows: The UE may report, in real time or periodically, a signal measurement report of the UE to the source base station on which the UE currently camps, and the source base station may determine, based on the signal measurement report reported by the UE, that the UE is handed over from the source base station to the target base station. For example, the source base station determines, based on signal quality of a base station of each cell in the signal measurement report, whether the UE needs to be handed over from the source base station to the target base station. If it is determined that the UE needs to be handed over, the source base station controls the UE to be handed over to the target base station, and sends the handover notification to the user plane network element, so as to notify the user plane network element that the UE has been handed over from the source base station to the target base station. Optionally, the handover notification may carry information such as an identifier of the UE, an identifier of the source base station, and an identifier of the target base station. This is not limited in this disclosure.

S102. The source base station receives the first data packet sent by the user plane network element through the path used before the handover, and the source base station modifies the first mark in the first data packet to a second mark, where the second mark is used to indicate that a modified first data packet is an in-transit data packet.

S103. The source base station obtains third routing information, encapsulates the modified first data packet based on the third routing information, to obtain a third data packet, and sends the third data packet to the target base station, and the target base station receives the third data packet.

The third routing information is carried in a temporary forwarding table created after the source base station sends the handover notification, and the third routing information is information about one or more third nodes through which the third data packet passes from the source base station to the target base station.

After the UE is handed over from the source base station to the target base station, the source base station cannot directly send the received first data packet to the UE, but needs to forward the first data packet to the target base station, and the target base station sends the first data packet to the UE. Therefore, after the UE is handed over from the source base station to the target base station, the source base station creates the temporary forwarding table. The third routing information is carried in the temporary forwarding table. After the source base station receives the first data packet and modifies the first mark in the first data packet to the second mark, the source base station obtains the third routing information, encapsulates the third routing information in the modified first data packet, to obtain the third data packet. The source base station sends the third data packet to the target base station, and the one or more third nodes send the third data packet to the target base station based on the third routing information encapsulated in the third data packet.

In a possible embodiment, when the source base station encapsulates the third routing information in the modified first data packet, the third routing information may be carried in a third routing field, and the source base station encapsulates the third routing field in the modified first data packet to obtain the third data packet.

In a possible embodiment, the source base station encapsulates the third routing information and the second mark in the modified first data packet to obtain the third data packet.

S104. After receiving the handover notification, the user plane network element sends a second data packet to the source base station, where a third mark is carried in the second data packet, and the third mark is used to indicate that the user plane network element stops sending data to the source base station through the path used before the handover.

After receiving the handover notification, the user plane network element determines that the source base station can no longer directly send the first data packet to the UE. The user plane network element sends, to the source base station, the second data packet encapsulated with second routing information and the third mark, so as to indicate to the source base station that the user plane network element no longer sends the data to the source base station through the path used before the handover. The second routing information is carried in the second routing field, and the second routing information is information about one or more second nodes through which the second data packet passes from the user plane network element to the source base station.

S105. The source base station receives the second data packet, encapsulates the second data packet based on the third routing information, to obtain a fifth data packet, and sends the fifth data packet to the target base station.

After receiving the second data packet, the source base station determines, based on the third mark, that the user plane network element no longer sends the first data packet to the source base station. The source base station obtains the third routing information, encapsulates the third routing information in the second data packet to obtain the fifth data packet, and sends the fifth data packet to the target base station, so as to notify the target base station that the source base station no longer sends data to the target base station.

In a possible embodiment, the second data packet may be a data packet that carries user data. The user plane network element encapsulates the second routing information and the third mark in the data packet that needs to be sent to the UE and that is received after the user plane network element receives the handover notification, to form the second data packet.

In another possible embodiment, the second data packet may be a data packet that is generated by the user plane network element and that does not include user data and is encapsulated with only the second routing information and the third mark. The data packet is only used to notify the source base station that the user plane network element no longer sends the data to the source base station through the path used before the handover.

In a possible embodiment, when the source base station encapsulates the third routing information in the second data packet, the third routing information may be carried in a fifth routing field, and the source base station encapsulates the fifth routing field in the second data packet to obtain the fifth data packet.

In a possible embodiment, the source base station encapsulates the third routing information and the third mark into the second data packet to obtain the fifth data packet.

S106. The user plane network element sends a fourth data packet to the target base station through a path used after the handover, and the target base station receives and buffers the fourth data packet, where a fourth mark is carried in the fourth data packet, and the fourth mark is used to indicate that the fourth data packet is from the user plane network element.

After the user plane network element receives the handover notification and then receives a data packet that needs to be sent to the UE, the user plane network element encapsulates fourth routing information and the fourth mark in the data packet to obtain the fourth data packet, and sends the fourth data packet to the target base station through the path used after the handover. The target base station receives the fourth data packet and buffers the fourth data packet in the target base station. The fourth mark is the same as the first mark. The fourth routing information is carried in a fourth routing field. The fourth routing information is information about one or more fourth nodes through which the fourth data packet passes from the user plane network element to the target base station.

S107. Before receiving the fifth data packet, the target base station sends the third data packet to the user equipment, and after receiving the fifth data packet, the target base station sends the buffered fourth data packet to the user equipment.

The fifth data packet carries the third mark. For the target base station, the third mark is used to indicate that the source base station no longer sends the data to the target base station.

After the user plane network element receives the handover notification, the target base station receives the third data packet that is sent by the source base station and that carries the second mark, and receives the fourth data packet that is sent by the user plane network element and that carries the fourth mark. Because the target base station does not receive the fifth data packet that carries the third mark, it indicates that the source base station further continues to send the third data packet to the target base station. Because the third data packet is sent from the user plane network element before the fourth data packet, the target base station deletes the third routing information and the third mark that are in the received third data packet, to obtain the modified first data packet, then deletes the first routing information and the second mark that are in the modified first data packet, sends, to the UE, the first data packet in which the first routing information and the second mark are deleted, and buffers the fourth data packet in the target base station.

After receiving the fifth data packet, the target base station determines, based on the third mark in the fifth data packet, that the source base station no longer sends data to the target base station. If the second data packet carries only the second routing information and the third mark, in other words, there is no user data in the second data packet, the fifth data packet obtained by encapsulating the third routing information and the third mark in the second data packet has no user data, either. After sending, to the UE, the modified first data packet in which the first routing information and the second mark are deleted, the target base station deletes the fourth routing information and the fourth mark in the buffered fourth data packet, and sends, to the UE, the fourth data packet in which the fourth routing information and the fourth mark are deleted. If the fifth data packet is a data packet that carries user data, after sending, to the UE, the modified first data packet in which the first routing information and the second mark are deleted, the target base station deletes the third routing information and the third mark in the fifth data packet to obtain the second data packet, then deletes the second routing information and the third mark in the second data packet, sends, to the UE, the second data packet in which the second routing information and the third mark are deleted, finally deletes the fourth routing information and the fourth mark in the buffered fourth data packet, and sends, to the UE, the fourth data packet in which the fourth routing information and the fourth mark are deleted.

In this embodiment of the present disclosure, a mark is added to the data packet. After the user equipment is handed over from the original device to the target device, and before the user plane network element receives the handover notification, the user plane network element sends, to the original device through the path used before the handover, the data packet that carries the first mark. The original device modifies the first mark in the data packet to the second mark, and then forwards, to the target device, the data packet whose mark is modified and that carries the second mark. After receiving the handover notification, the user plane network element first sends, to the original device, the data packet that carries the third mark, and then sends, to the target device, the data packet that carries the fourth mark (which is the same as the first mark). Before receiving the data packet that carries the third mark, the target device sends, to the user equipment, the data packet that carries the second mark, and buffers the data packet that carries the fourth mark. After receiving the data packet that carries the third mark, the target device sends, to the user equipment, the buffered data packet that carries the fourth mark. The target device can distinguish, based on different marks in the received data packets, whether a received data packet is an in-transit data packet or a new path data packet, and determine a sequence of sending the data packets to the user equipment, so as to ensure ordered data transmission in an SRv6 solution.

In this embodiment of this disclosure, the first routing information and the first mark, the second routing information and the third mark, the third routing information and the second mark, and the fourth routing information and the fourth mark may be encapsulated in corresponding data packets in the following two manners:

In the first manner, a routing field is encapsulated in each type of data packet. For example, the first routing field is encapsulated in the first data packet. Both the routing information (the first routing information, the second routing information, the third routing information, and the fourth routing information) and the mark information (the first mark, the second mark, the third mark, and the fourth mark) may be carried in the routing field. Each routing field may include one or more routing units. The one routing unit has a correspondence with one node on a data packet transmission path. There is a one-to-one correspondence between the plurality of routing units and a plurality of nodes on the data packet transmission path. Each of the one or more routing units includes a route distinguisher and a data source identifier. Node information of each of the one or more nodes is carried in a route distinguisher of a corresponding routing unit. Each node can identify only a mark in a data source identifier in a routing unit corresponding to the node. Therefore, in order that any node can distinguish whether a received data packet is an in-transit data packet or a new path data packet, each node corresponds to one mark, and the mark corresponding to each node is carried in a data source identifier of a corresponding routing unit. For example, the first routing field encapsulated in the first data packet includes one or more first routing units. The one first routing unit has a correspondence with the one first node. The plurality of first routing units have a one-to-one correspondence with the plurality of first nodes. Each first routing unit includes at least a route distinguisher and a data source identifier. Node information of each of the one or more first nodes is carried in a route distinguisher of a corresponding first routing unit. The first mark corresponding to each first node is carried in a data source identifier of each first routing unit.

Figure 6:
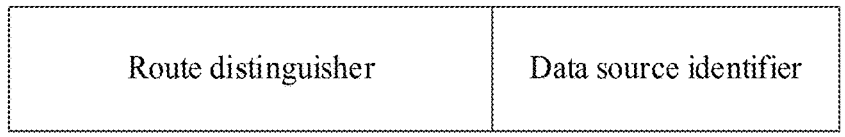
FIG. 6 is a structural diagram of a redefined IPv6 address according to an embodiment of the present disclosure.

In a possible embodiment, a redefined SRH may be used for the routing field. The redefined SRH means that an IPv6 address in an SRH is redefined. FIG. 6 is a structural diagram of a redefined IPv6 address according to an embodiment of this disclosure. One or more routing units in the routing field correspond to an IPv6 address list in the SRH. Each routing unit corresponds to one redefined IPv6 address in the IPv6 address list. Each redefined IPv6 address corresponds to one node. Each redefined IPv6 address includes at least two parts: a route distinguisher and a data source identifier. Each node searches for corresponding quality of service profile (quality of service profile, QoS profile) information based on the route distinguisher, processes the data packet based on the QoS profile information, and routes the data packet to a next node based on the route distinguisher. The mark corresponding to each node is carried in the data source identifier, so that each node distinguishes whether the data packet is an in-transit data packet or a new path data packet. Each redefined IPv6 address may be in a form shown in FIG. 6. 4 bits of each redefined IPv6 address may be used as the data source identifier, and remaining 124 bits are used as the route distinguisher. For example, 0000 may be used to represent the first mark and the fourth mark, 0001 may be used to represent the second mark, and 0010 may be used to represent the third mark route distinguisher. It may be understood that, in the redefined IPv6 address that includes the two parts: the route distinguisher and the data source identifier, because at least three marks need to be represented, the data source identifier requires at least 2 bits. Therefore, when it is ensured that the data source identifier is no less than 2 bits and no greater than 4 bits, a length of each part of the redefined IPv6 address may be set as required. This is not specifically limited in this embodiment of this disclosure.

In the second manner, the foregoing each type of data packet may further include an extension field. The first mark, the second mark, the third mark, and the fourth mark may be carried in the extension field. The mark carried in the extension field is shared by all nodes on the data packet transmission path, and all the nodes on the data packet transmission path can read the mark in the extension field.

Figure 7:
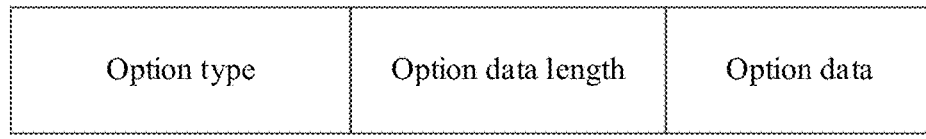
FIG. 7 is a schematic structural diagram of an option field in an SRH according to an embodiment of the present disclosure.

In a possible embodiment, the extension field may be an option (options) field in the SRH, to be specific, in this manner, the IPv6 address in a segment list in the SRH is not redefined, an IPv6 address structure remains unchanged, and the mark is carried by using the option field in the SRH. The IPv6 address structure in the segment list in the SRH is unchanged. Each node corresponds to one IPv6 address of 128 bits. The option field after the segment list in the SRH carries the mark. The option field is encoded in a TLV format. FIG. 7 is a schematic diagram of an option field in an SRH according to an embodiment of this disclosure. In the option field, an "option type" is used to determine a method for processing the option by a node, an "option data length" represents a length of option data, and "option data" represents an actual value of the field. In this embodiment of this disclosure, "option data" of 2 bits may be used to represent a mark. For example, 00 is used to represent the first mark and the fourth mark, 01 is used to represent the second mark, and 10 is used to represent the third mark. Certainly, because both the first mark and the fourth mark indicate that a data packet is from the user plane network element, when the SRH in the data packet does not include the option field, the data packet is, by default, the data packet that carries the first mark or the fourth mark.

Figure 8:
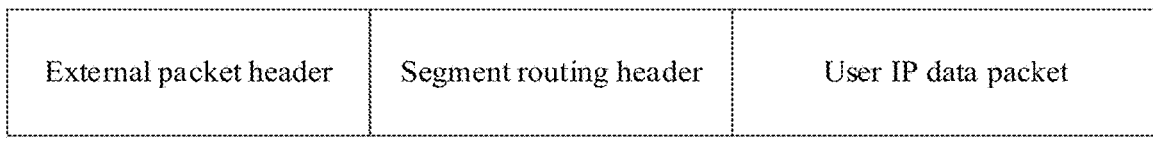
FIG. 8 is a schematic diagram of a location of an SRH in a data packet according to an embodiment of the present disclosure.

In the foregoing two possible embodiments, for locations of the SRH and the redefined SRH in the data packet, refer to FIG. 8. The SRH is used as an example. FIG. 8 is a schematic diagram of a location of an SRH in a user data packet. In the figure, the user data packet includes an external packet header, the SRH, and a user IP data packet. The SRH is located between the external packet header and the user IP data packet. The external packet header may be a packet header at a data link layer, or may be an IP packet header or another data packet header. This is not specifically limited in this embodiment of the present disclosure.

In the foregoing two manners, in the first manner, both the information about the one or more nodes through which each type of data packet needs to pass during transmission and a mark corresponding to each type of data packet are encapsulated in the routing field. For example, both the information about the one or more second nodes through which the second data packet passes from the user plane network element to the original device and the third mark corresponding to the second data packet are encapsulated in the redefined IPv6 in the SRH. In the second manner, the information about the one or more nodes through which each type of data packet needs to pass during transmission is encapsulated in the routing field, and the mark corresponding to each type of data packet is encapsulated in the extension field. For example, the information about the one or more second nodes through which the second data packet passes from the user plane network element to the original device is encapsulated in the IPv6 address in the segment list of the SRH, and the third mark corresponding to the second data packet is encapsulated in the option field of the SRH.

In this embodiment of this disclosure, the user plane network element and/or the source base station may encapsulate the routing information and the mark in the data packet in any one of the foregoing two manners. For example, both the user plane network element and the source base station encapsulate corresponding routing information and mark information in the first manner or the second manner, or the user plane network element encapsulates the first routing information and the first mark in the first manner to form the first data packet, encapsulates the second routing information and the third mark in the second manner to form the second data packet, and encapsulates the fourth routing information and the fourth mark in the second manner to form the fourth data packet. The source base station encapsulates the third routing information and the second mark in the first manner to form the third data packet. In this disclosure, the manner of encapsulating the routing information and the mark by the user plane network element and the source base station is not specifically limited.

The method in the embodiments of the present disclosure is described in detail above. For ease of better implementing the foregoing solutions in the embodiments of the present disclosure, correspondingly, related apparatuses used to cooperate in implementing the foregoing solutions are further provided below.

Figure 9:
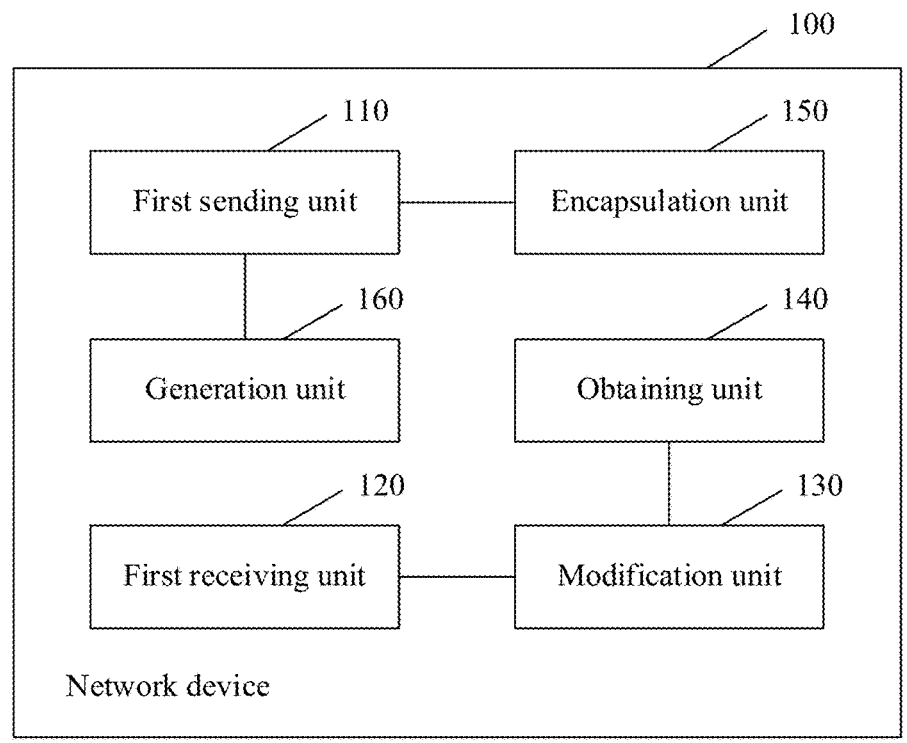
FIG. 9 is a schematic structural diagram of a network device according to an embodiment of the present disclosure.

FIG. 9 is a schematic structural diagram of a network device according to an embodiment of this disclosure. As shown in FIG. 9, the network device 100 includes at least a first sending unit 110, a first receiving unit 120, and a modification unit 130.

The first sending unit 110 is configured to send a handover notification to a user plane network element, where the handover notification includes at least information such as information about handover of user equipment from the network device 100 to a target device, an identifier of the user equipment, an identifier of the network device 100, and an identifier of the target device.

The first receiving unit 120 is configured to receive a first data packet sent by the user plane network element through a path used before the handover, where a first mark is carried in the first data packet, and the first mark is used to indicate that the first data packet is from the user plane network element.

The modification unit 130 is configured to: after the first data packet is received, modify the first mark in the first data packet to a second mark, where the second mark is used to indicate that a modified first data packet is an in-transit data packet, and the in-transit data packet is a data packet that should be sent to the target device by the user plane network element after the handover, but is sent to the network device 100.

The first sending unit 110 is further configured to send the modified first data packet to the target device.

The first receiving unit 120 is further configured to receive a second data packet sent by the user plane network element, where a third mark is carried in the second data packet, and the third mark is used to indicate that the user plane network element stops sending data to the network device 100 through the path used before the handover.

The second sending unit 110 is further configured to send the second data packet to the target device.

In an optional embodiment, as shown in FIG. 9, the network device 100 further includes an obtaining unit 140 and an encapsulation unit 150.

The obtaining unit 140 is configured to obtain third routing information, where the third routing information is recorded in a temporary forwarding table created after the network device 100 sends the handover notification.

The encapsulation unit 150 is configured to encapsulate the modified first data packet based on the third routing information to obtain a third data packet, where the third routing information is information about one or more third nodes through which the third data packet passes from the network device 100 to the target device.

The first sending unit 110 is further configured to send the modified first data packet to the target device. Specifically, the third data packet is sent to the target device.

The encapsulation unit 150 is further configured to: after the second data packet is received, encapsulate the third routing information and the third mark into the second data packet, to obtain a fifth data packet.

That the first sending unit 110 is further configured to send the second data packet to the target device is specifically to send the fifth data packet to the target device.

Optionally, the network device 100 further includes a generation unit 160, configured to: after the user equipment is handed over from the network device 100 to the target device, generate the handover notification.

In this embodiment of this disclosure, a processing manner, such as modification, encapsulation, and forwarding, of the received data packet by the units of the network device 100 is corresponding to a processing manner of the data packet by the source base station in the foregoing method embodiment, and details are not described herein again.

Figure 10:
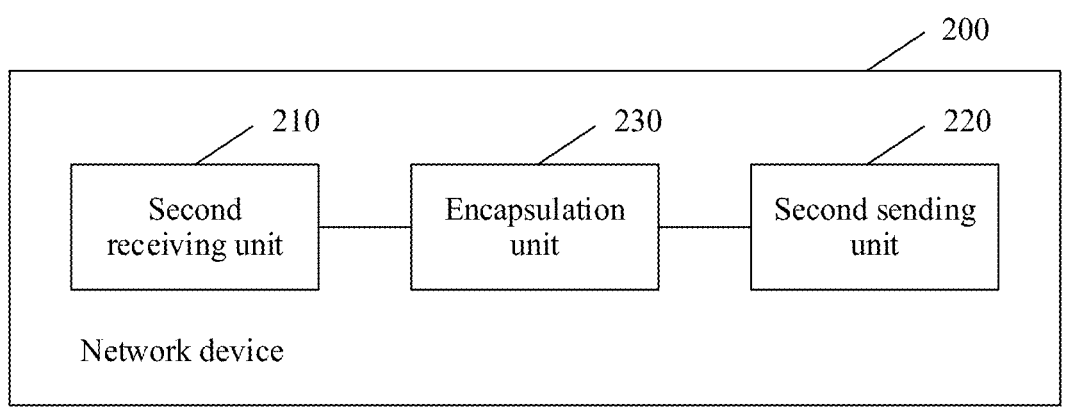
FIG. 10 is a schematic structural diagram of another network device according to an embodiment of the present disclosure.

FIG. 10 is a schematic structural diagram of a network device according to an embodiment of this disclosure. As shown in FIG. 10, the network device 200 includes at least a second receiving unit 210 and a second sending unit 220.

The second receiving unit 210 is configured to receive a handover notification, where the handover notification includes at least information such as information about handover of user equipment from the original device to a target device, an identifier of the user equipment, an identifier of the original device, and an identifier of the target device.

The second sending unit 220 is configured to send a first data packet to the original device through a path used before the handover, where a first mark is carried in the first data packet, and the first mark is used to indicate that the first data packet is from the network device 200.

The second sending unit 220 is further configured to: after the second receiving unit 210 receives the handover notification, send a second data packet to the original device, where a third mark is carried in the second data packet, and the third mark is used to indicate that the network device 200 stops sending data to the original device through the path used before the handover.

The second sending unit 220 is further configured to: after sending the second data packet, send a fourth data packet to the target device through a path used after the handover, where a fourth mark is carried in the fourth data packet, and the fourth mark is used to indicate that the fourth data packet is from the network device 200.

In an optional embodiment, the network device 200 further includes an encapsulation unit 230.

The encapsulation unit 230 is configured to: when the second receiving unit 210 receives a data packet that needs to be sent to the UE, encapsulate first routing information and the first data packet in the received data packet to obtain the first data packet, where the first routing information is information about one or more first nodes through which the first data packet passes from the network device 200 to the original device.

The encapsulation unit 230 is further configured to: after the network device 200 receives the handover notification, encapsulate second routing information and the third mark into a data packet to form the second data packet, where the second routing information is information about one or more second nodes through which the second data packet is transmitted from the network device 200 to the original device.

The encapsulation unit 230 is further configured to: after the second sending unit 220 sends the second data packet, and when the second receiving unit 210 receives the data packet that needs to be sent to the UE, encapsulate fourth routing information and the fourth mark in the received data packet to obtain the fourth data packet, where the fourth routing information is information about one or more fourth nodes through which the fourth data packet is transmitted from the network device 200 to the target device.

In this embodiment of this disclosure, a processing manner, such as encapsulation and forwarding, of the received data packet by the network device 200 is corresponding to a processing manner of the data packet by the user plane network element in the foregoing method embodiment, and details are not described herein again.

Figure 11:
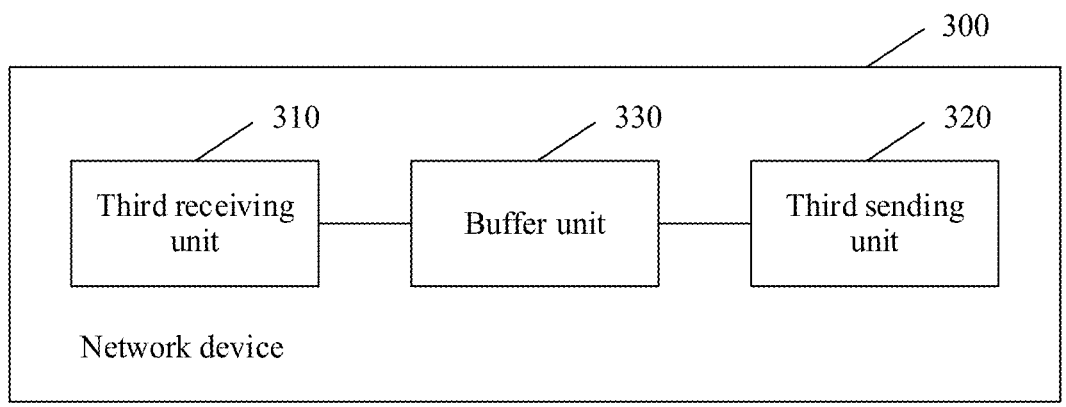
FIG. 11 is a schematic structural diagram of another network device according to an embodiment of the present disclosure.

FIG. 11 is a schematic structural diagram of a network device according to an embodiment of this disclosure. As shown in FIG. 11, the network device 300 includes at least a third receiving unit 310, a third sending unit 320, and a buffer unit 330.

The third receiving unit 310 is configured to: after receiving a handover notification, receive a fourth data packet sent by a user plane network element, where the fourth mark is carried in the fourth data packet, and the fourth mark is used to indicate that the fourth data packet is from the user plane network element.

The buffer unit 330 is configured to buffer the fourth data packet.

The receiving unit 310 is further configured to receive a third data packet sent by an original device, where a second mark is carried in the third data packet, the second mark is used to indicate that the third data packet is an in-transit data packet, and the in-transit data packet is data that should be sent to the network device 300 by the user plane network element after handover, but is sent to the original device.

The sending unit 320 is configured to forward the received third data packet to user equipment.

The sending unit 320 is further configured to: after the receiving device 310 receives a fifth data packet, send the buffered fourth data packet to the user equipment, or send the fifth data packet to the user equipment, and then send the fourth data packet to the user equipment, where a third mark is carried in the fifth data packet, and the third mark is used to indicate that the original device stops sending data to the network device 300.

In this embodiment of this disclosure, a processing manner, such as forwarding, of the received data packet by the network device 300 is corresponding to a processing manner of the data packet by the target base station in the foregoing method embodiment, and details are not described herein again.

It can be understood that, to implement the foregoing functions, the devices include corresponding hardware structures and/or software modules for executing the functions. A person of ordinary skill in the art should easily be aware that, in combination with the examples described in the embodiments disclosed in this specification, units, methods blocks may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In the embodiments of this disclosure, function unit division may be performed on the devices based on the foregoing method examples. For example, each function unit may be obtained through division based on a corresponding function, or two or more functions may be integrated into one processing unit. The integrated unit may be implemented in a form of hardware, or may be implemented in a form of a software functional unit. It should be noted that, in this embodiment of this disclosure, unit division is an example, and is merely a logical function division. In actual implementation, another division manner may be used.

Figure 12:
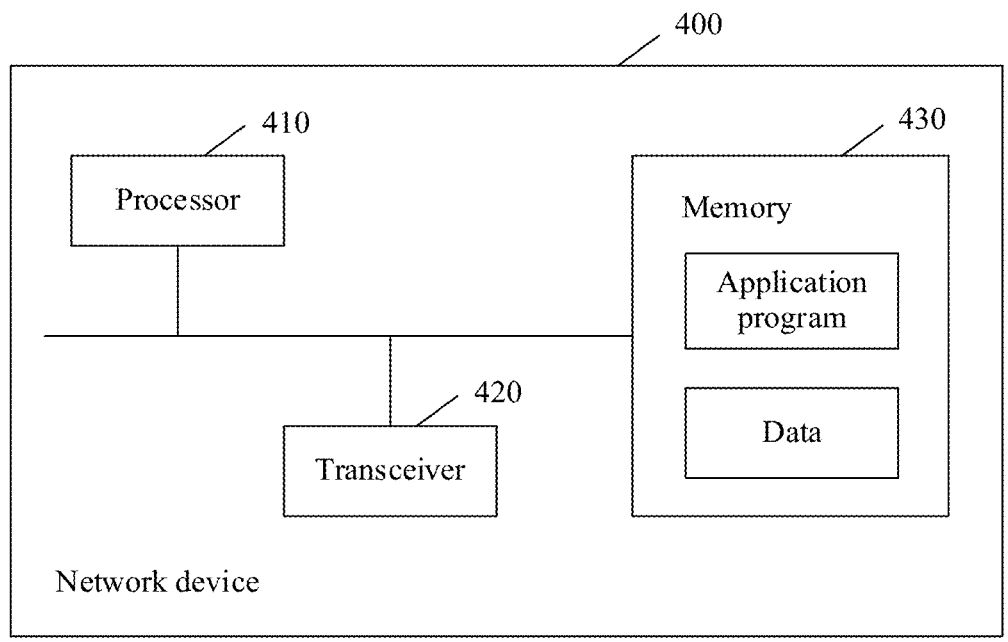
FIG. 12 is a schematic structural diagram of another network device according to an embodiment of the present disclosure.

FIG. 12 is a schematic structural diagram of a network device according to an embodiment of this disclosure. The original device 400 includes at least a processor 410, a transceiver 420, and a memory 430. The processor 410, the transceiver 420, and the memory 430 are connected to each other by using a bus 440.

The processor 410 may be a central processing unit (central processing unit, CPU), or a combination of the CPU and a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL), or any combination thereof.

The transceiver 420 such as a radio frequency module may include a receiver and a transmitter. That the processor 410 receives or sends a message described below may be specifically understood as that the processor 410 receives or sends a message by using the transceiver.

The memory 430 includes but is not limited to a random access memory (random access memory, RAM), a read-only memory (read-only memory, ROM), or an erasable programmable read-only memory (erasable programmable read-only memory, EPROM, or flash memory). The memory 430 is configured to store related instructions and data, and may transmit the stored data to the processor 410.

The processor 410 in the original device 400 is configured to read a related instruction in the memory 430 to perform the following operations.

The processor 410 controls the transmitter in the transceiver 420 to send a handover notification.

The processor 410 receives, by using the receiver in the transceiver 420, a first data packet sent by a user plane network element, where the first mark is carried in the first data packet, and the first mark is used to indicate that the first data packet is from the user plane network element.

The processor 410 modifies the first mark in the first data packet to a second mark, and sends the modified first data packet to a target device by using the transmitter in the transceiver 420.

The processor 410 receives, by using the receiver in the transceiver 420, a second data packet sent by the user plane network element, where a third mark is carried in the second data packet, and the third mark is used to indicate that the user plane network element stops sending data to the original device through a path used before handover.

The transmitter in the transceiver 420 sends the second data packet to the target device.

Specifically, for specific implementation of various operations performed by the network device 400, refer to a specific operation of the source base station in the foregoing method embodiment. Details are not described herein again.

Figure 13:
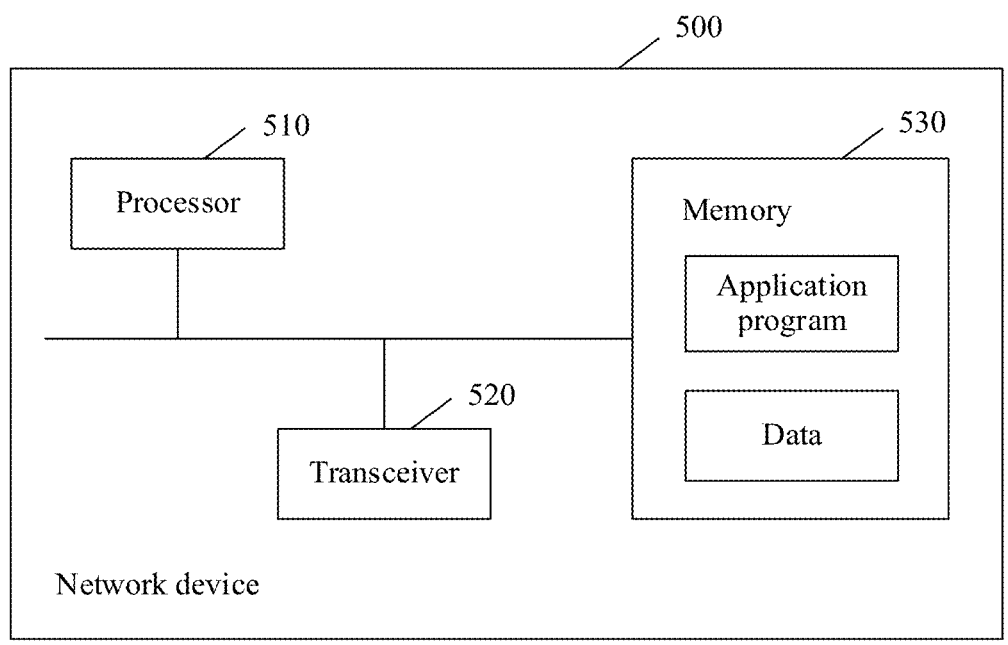
FIG. 13 is a schematic structural diagram of another network device according to an embodiment of the present disclosure.

FIG. 13 is a schematic structural diagram of a network device according to an embodiment of this disclosure. The user plane network element 500 includes at least a processor 510, a transceiver 520, and a memory 530. The processor 510, the transceiver 520, and the memory 530 are connected to each other by using a bus 540.

The processor 510 may be a central processing unit (central processing unit, CPU), or a combination of the CPU and a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL), or any combination thereof.

The transceiver 520 such as a radio frequency module may include a receiver and a transmitter. That the processor 510 receives or sends a message described below may be specifically understood as that the processor 510 receives or sends a message by using the transceiver.

The memory 530 includes but is not limited to a random access memory (random access memory, RAM), a read-only memory (read-only memory, ROM), or an erasable programmable read-only memory (erasable programmable read-only memory, EPROM, or flash memory). The memory 530 is configured to store related instructions and data, and may transmit the stored data to the processor 510.

The processor 510 in the user plane network element 500 is configured to read a related instruction in the memory 530 to perform the following operations.

The processor 510 sends, by using the transmitter in the transceiver 520, a first data packet to an original device through a path used before handover, where a first mark is carried in the first data packet, and the first mark is used to indicate that the first data packet is from the user plane network element.

After receiving a handover notification by using the receiver in the transceiver 520, the processor 510 sends a second data packet to the original device by using the transmitter in the transceiver 520. A third mark is carried in the second data packet, and the third mark is used to indicate that the user plane network element stops sending data to the original device through the path used before the handover.

After sending the second data packet by using the transmitter in the transceiver 520, the processor 510 sends, by using the transmitter in the transceiver 520, a fourth data packet to a target device through a path used after the handover. A fourth mark is carried in the fourth data packet, and the fourth mark is used to indicate that the fourth data packet is from the user plane network element.

Specifically, for specific implementation of various operations performed by the user plane network element 500, refer to a specific operation of the user plane network element in the foregoing method embodiment. Details are not described herein again.

Figure 14:
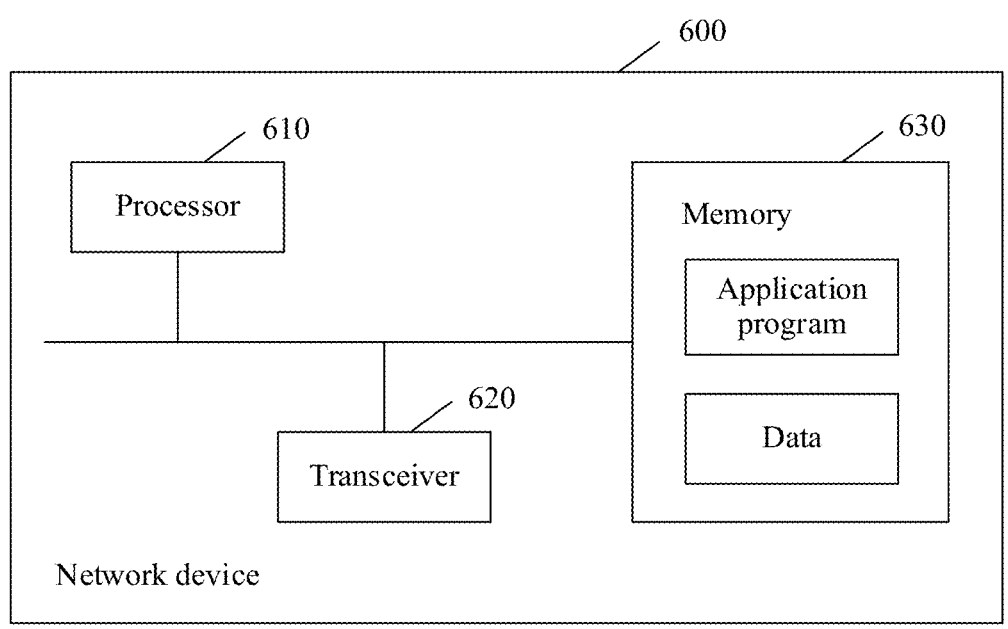
FIG. 14 is a schematic structural diagram of another network device according to an embodiment of the present disclosure.

FIG. 14 is a schematic structural diagram of a network device according to an embodiment of this disclosure. The target device 600 includes at least a processor 610, a transceiver 620, and a memory 630. The processor 610, the transceiver 620, and the memory 630 are connected to each other by using a bus 640.

The processor 610 may be a central processing unit (central processing unit, CPU), or a combination of the CPU and a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL), or any combination thereof.

The transceiver 620 such as a radio frequency module may include a receiver and a transmitter. That the processor 610 receives or sends a message described below may be specifically understood as that the processor 610 receives or sends a message by using the transceiver.

The memory 630 includes but is not limited to a random access memory (random access memory, RAM), a read-only memory (read-only memory, ROM), or an erasable programmable read-only memory (erasable programmable read-only memory, EPROM, or flash memory). The memory 630 is configured to store related instructions and data, and may transmit the stored data to the processor 610.

The processor 610 in the target device 600 is configured to read a related instruction in the memory 630 to perform the following operations.

After the processor 610 receives a handover notification by using the receiver in the transceiver 620, the processor 610 receives, by using the receiver in the transceiver 620, a fourth data packet sent by a user plane network element, and buffers the fourth data packet into the memory 630. The fourth mark is carried in the fourth data packet, and the fourth mark is used to indicate that the fourth data packet is from the user plane network element.

The processor 610 receives, by using the receiver in the transceiver 620, a third data packet sent by an original device, and sends the third data packet to the target device by using the transmitter in the transceiver 620. A second mark is carried in the third data packet, the second mark is used to indicate that the third data packet is an in-transit data packet, and the in-transit data packet is data that should be sent to the target device by the user plane network element after handover, but is sent to the original device.

The processor 610 receives, by using the receiver in the transceiver 620, a fifth data packet sent by the original device, where a third mark is carried in the fifth data packet, and the third mark is used to indicate that the original device stops sending data to the target device.

The processor 610 sends the buffered fourth data packet to user equipment by using the transmitter in the transceiver 620, or sends the fifth data packet to the user equipment, and then sends the fourth data packet to the user equipment.

Specifically, for specific implementation of various operations performed by the target device 600, refer to a specific operation of the target base station in the foregoing method embodiment. Details are not described herein again.

All or some of the foregoing embodiments may be implemented through software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedures or functions according to the embodiments of this disclosure are generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

The embodiments of this disclosure are described in detail above. The principle and implementation of this disclosure are described herein by using specific examples. The description about the foregoing embodiments is merely provided to help understand the method and core ideas of this disclosure. In addition, a person of ordinary skill in the art can make variations and modifications in terms of the specific implementations and disclosure scopes according to the ideas of this disclosure. Therefore, the content of specification shall not be construed as a limitation to this disclosure.

What is claimed is:

1. A method, comprising:
receiving, by an original device after sending a handover notification, a first data packet sent by a user plane network element through a path used before handover, wherein the first data packet comprises a first mark, and the first mark is used to indicate that the first data packet is from the user plane network element;
modifying the first mark in the first data packet to a second mark, and sending a modified first data packet to a target device, wherein the second mark is used to indicate that the modified first data packet is an in-transit data packet, and the in-transit data packet is data that should be sent to the target device by the user plane network element after the handover, but is sent to the original device;
receiving a second data packet sent by the user plane network element, wherein the second data packet comprises a third mark, and the third mark is used to indicate that the user plane network element stops sending data to the original device through the path used before the handover; and
sending the second data packet to the target device.

2. The method of claim 1, wherein
the first data packet comprises at least a first routing field, the first routing field comprises first routing information, and the first routing information is information about one or more first nodes through which the first data packet passes from the user plane network element to the original device; and
the second data packet comprises at least a second routing field, the second routing field comprises second routing information, and the second routing information is information about one or more second nodes through which the second data packet passes from the user plane network element to the original device.

3. The method of claim 2, wherein
the first routing field comprises one or more first routing units, the one first routing unit has a correspondence with the one first node, the one or more first routing units have a one-to-one correspondence with the one or more first nodes, each of the one or more first routing units comprises at least a route distinguisher and a data source identifier, the route distinguisher of a corresponding first routing unit comprises node information of each of the one or more first nodes, and the data source identifier of each of the one or more first routing units comprises the first mark; and
the second routing field comprises one or more second routing units, the one second routing unit has a correspondence with the one second node, the one or more second routing units have a one-to-one correspondence with the one or more second nodes, each of the one or more second routing units comprises at least a route distinguisher and a data source identifier, the route distinguisher of a corresponding second routing unit comprises node information of each of the one or more second nodes, and the data source identifier of each of the one or more second routing units comprises the third mark.

4. The method of claim 2, wherein
the first data packet further comprises a first extension field, and the first extension field comprises the first mark; and
the second data packet further comprises a second extension field, and the second extension field comprises the third mark.

5. The method of claim 1, wherein the sending a modified first data packet to a target device comprises:
obtaining third routing information, wherein a temporary forwarding table created by the original device after the handover notification is sent comprises the third routing information;
encapsulating the modified first data packet based on the third routing information to obtain a third data packet, wherein the third routing information is information about one or more third nodes through which the third data packet passes from the original device to the target device; and
sending the third data packet to the target device.

6. The method of claim 5, wherein the third data packet comprises at least a third routing field, and the third routing field comprises the third routing information.

7. The method of claim 6, wherein
the third routing field comprises one or more third routing units, the one third routing unit has a correspondence with the one third node, the one or more third routing units have a one-to-one correspondence with the one or more third nodes, each of the one or more third routing units comprises at least a route distinguisher and a data source identifier, the route distinguisher of a corresponding third routing unit comprises node information of each of the one or more third nodes, and the data source identifier of each of the one or more third routing units comprises the second mark.

8. The method of claim 6, wherein the third data packet further comprises a third extension field, and the third extension field comprises the third mark.

9. The method of claim 1, wherein the sending the second data packet to the target device comprises:
obtaining third routing information, wherein a temporary forwarding table created by the original device after the handover notification is sent comprises the third routing information;
encapsulating the second data packet based on the third routing information to obtain a fifth data packet, wherein the third routing information is information about one or more fifth nodes through which the fifth data packet passes from the original device to the target device; and
sending the fifth data packet to the target device.

10. The method of claim 9, wherein the fifth data packet comprises at least a fifth routing field, and the fifth routing field comprise the third routing information.

11. The method of claim 10, wherein
the fifth routing field comprises one or more fifth routing units, the one fifth routing unit has a correspondence with the one fifth node, the one or more fifth routing units have a one-to-one correspondence with the one or more fifth nodes, each of the one or more fifth routing units comprises at least a route distinguisher and a data source identifier, the route distinguisher of a corresponding fifth routing unit comprises node information of each of the one or more fifth nodes, and the data source identifier of each of the one or more fifth routing units comprises the third mark.

12. The method of claim 10, wherein the fifth data packet further comprises a fifth extension field, and the fifth extension field comprises the third mark.

13. A method, comprising:
sending, by a user plane network element before receiving a handover notification, a first data packet to an original device through a path used before handover, wherein the first data packet comprises a first mark, and the first mark is used to indicate that the first data packet is from the user plane network element;
sending, by the user plane network element after receiving the handover notification, a second data packet to the original device, wherein the second data packet comprises a third mark, and the third mark is used to indicate that the user plane network element stops sending data to the original device through the path used before the handover; and
sending, by the user plane network element, a fourth data packet to a target device through a path used after the handover, wherein the fourth data packet comprises a fourth mark, and the fourth mark is used to indicate that the fourth data packet is from the user plane network element.

14. The method of claim 13, wherein
the first data packet comprises at least a first routing field, the first routing field comprises first routing information, and the first routing information is information about one or more first nodes through which the first data packet passes from the user plane network element to the original device;
the second data packet comprises at least a second routing field, the second routing field comprises second routing information, and the second routing information is information about one or more second nodes through which the second data packet passes from the user plane network element to the original device; and
the fourth data packet comprises at least a fourth routing field, the fourth routing field comprises fourth routing information, and the fourth routing information is information about one or more fourth nodes through which the fourth data packet passes from the user plane network element to the target device.

15. The method of claim 14, wherein
the first routing field comprises one or more first routing units, the one first routing unit has a correspondence with the one first node, the one or more first routing units have a one-to-one correspondence with the one or more first nodes, each of the one or more first routing units comprises at least a route distinguisher and a data source identifier, the route distinguisher of a corresponding first routing unit comprises node information of each of the one or more first nodes, and the data source identifier of each of the one or more first routing units comprises the first mark;
the second routing field comprises one or more second routing units, the one second routing unit has a correspondence with the one second node, the one or more second routing units have a one-to-one correspondence with the one or more second nodes, each of the one or more second routing units comprises at least a route distinguisher and a data source identifier, the route distinguisher of a corresponding second routing unit comprises node information of each of the one or more second nodes, and the data source identifier of each of the one or more second routing units comprises the third mark; and
the fourth routing field comprises one or more fourth routing units, the one fourth routing unit has a correspondence with the one fourth node, the one or more fourth routing units have a one-to-one correspondence with the one or more fourth nodes, each of the one or more fourth routing units comprises at least a route distinguisher and a data source identifier, the route distinguisher of a corresponding fourth routing unit comprises node information of each of the one or more fourth nodes, and the data source identifier of each of the one or more fourth routing units comprises the fourth mark.

16. The method of claim 14, wherein
the first data packet further comprises a first extension field, and the first extension field comprises the first mark;
the second data packet further comprises a second extension field, and the second extension field comprises the third mark; and
the fourth data packet further comprises a fourth extension field, the fourth extension field comprises the fourth mark, and the first mark and the fourth mark are the same.

17. A method, comprising:
receiving, by a target device after receiving a handover notification, a fourth data packet sent by a user plane network element, and buffering the fourth data packet, wherein the fourth data packet comprises a fourth mark, and the fourth mark is used to indicate that the fourth data packet is from the user plane network element;
receiving a third data packet sent by an original device, and sending the third data packet to a user equipment, wherein the third data packet comprises a second mark, the second mark is used to indicate that the third data packet is an in-transit data packet, and the in-transit data packet is data that should be sent to the target device by the user plane network element after handover, but is sent to the original device;
receiving a fifth data packet sent by the original device, wherein fifth data packet comprises a third mark, and the third mark is used to indicate that the original device stops sending data to the target device; and
sending the buffered fourth data packet to the user equipment, or sending the fifth data packet to the user equipment and then sending the fourth data packet to the user equipment.

18. The method of claim 17, wherein
the third data packet comprises at least a third routing field, the third routing field comprises third routing information, and the third routing information is information about one or more third nodes through which the third data packet passes from the original device to the target device;
the fourth data packet comprises at least a fourth routing field, the fourth routing field comprises fourth routing information, and the fourth routing information is information about one or more fourth nodes through which the fourth data packet passes from the user plane network element to the target device; and
the fifth data packet comprises at least a fifth routing field, and the fifth routing field comprises the third routing information.

19. The method of claim 18, wherein
the third routing field comprises one or more third routing units, the one third routing unit has a correspondence with the one third node, the one or more third routing units have a one-to-one correspondence with the one or more third nodes, each of the one or more third routing units comprises at least a route distinguisher and a data source identifier, the route distinguisher of a corresponding third routing unit comprises node information of each of the one or more third nodes, and the data source identifier of each of the one or more third routing units comprises the second mark;
the fourth routing field comprises one or more fourth routing units, the one fourth routing unit has a correspondence with the one fourth node, the one or more fourth routing units have a one-to-one correspondence with the one or more fourth nodes, each of the one or more fourth routing units comprises at least a route distinguisher and a data source identifier, the route distinguisher of a corresponding fourth routing unit comprises node information of each of the one or more fourth nodes, and the data source identifier of each of the one or more fourth routing units comprises the fourth mark; and
the fifth routing field comprises one or more fifth routing units, the one fifth routing unit has a correspondence with the one fifth node, the one or more fifth routing units have a one-to-one correspondence with one or more fifth nodes, each of the one or more fifth routing units comprises at least a route distinguisher and a data source identifier, the route distinguisher of a corresponding fifth routing unit comprises node information of each of the one or more fifth nodes, and the data source identifier of each of the one or more fifth routing units comprises the third mark.

20. The method of claim 18, wherein
the third data packet further comprises a third extension field, and the third extension field comprises the second mark;
the fourth data packet further comprises a fourth extension field, and the fourth extension field comprises the fourth mark; and
the fifth data packet further comprises a fifth extension field, and the fifth extension field comprises the third mark.

* * * * *